United States Patent
Al-Shuhail

(10) Patent No.: US 9,835,763 B2
(45) Date of Patent: Dec. 5, 2017

(54) METHOD OF MONITORING CARBON DIOXIDE LEAKAGE IN CARBON CAPTURE AND STORAGE RESERVOIRS

(71) Applicant: KING FAHD UNIVERSITY OF PETROLEUM AND MINERALS, Dhahran (SA)

(72) Inventor: Abdullatif Abdulrahman Shuhail Al-Shuhail, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 415 days.

(21) Appl. No.: 14/552,367

(22) Filed: Nov. 24, 2014

(65) Prior Publication Data

US 2016/0146969 A1    May 26, 2016

(51) Int. Cl.
- *G01V 3/00* (2006.01)
- *G01V 7/00* (2006.01)
- *G01V 11/00* (2006.01)

(52) U.S. Cl.
CPC .................................... *G01V 11/00* (2013.01)

(58) Field of Classification Search
CPC ... G01V 2210/6165; G01V 2210/6248; G01V 3/18; G01V 99/005; G01V 11/002; G01V 1/008; G01V 1/38; G01V 1/40; G01V 2210/614; G01V 2210/62; G01V 2210/624; G01V 2210/6242; G01V 2210/644; G01V 3/265

See application file for complete search history.

(56) References Cited

U.S. PATENT DOCUMENTS 8,384,389 B2    2/2013    Park et al.
2009/0306899 A1*    12/2009    Harris ................... G01V 3/083
                                                        702/13

(Continued)

FOREIGN PATENT DOCUMENTS

| JP | 2001-337175 | 12/2001 |
| KR | 10-0964712 | 6/2010 |
| KR | 10-2011-0036331 | 4/2011 |

OTHER PUBLICATIONS

Carcione et al., "Cross-hole electromagnetic and seismic modeling for CO2 detection and monitoring in a saline aquifer," Journal of Petroleum Science and Engineering, 2012.

*Primary Examiner* — Roy Y Yi
(74) *Attorney, Agent, or Firm* — Oblon, McClelland, Maier & Neustadt, L.L.P.

(57) ABSTRACT

The method of monitoring carbon dioxide leakage in carbon capture and storage reservoirs estimates porosity and water saturation in a porous medium, such as brine-saturated shale, as is common in carbon capture and storage reservoirs, based upon measured electrical conductivity and seismic P-wave velocity. The estimated porosity and water saturation may be used for monitoring carbon dioxide leakage from a carbon dioxide reservoir to the overlying cap rock of the region. Measured electrical conductivity and seismic P-wave velocity data are used by the present method to estimate the porosity and water saturation in the cap rock. If a decrease in water saturation in the cap rock is found, this indicates that carbon dioxide may be leaking up from the carbon dioxide reservoir. An alert signal is then generated to indicate that there may be a carbon dioxide leak.

2 Claims, 7 Drawing Sheets

(56) References Cited

U.S. PATENT DOCUMENTS

2013/0297273 A1 11/2013 Altundas et al.
2014/0174739 A1* 6/2014 Bourcier .............. C09K 8/5045
166/292

* cited by examiner

METHOD OF MONITORING CARBON DIOXIDE LEAKAGE IN CARBON CAPTURE AND STORAGE RESERVOIRS

BACKGROUND OF THE INVENTION

1. Field of the Invention

The present invention relates to carbon capture and storage (CCS), and particularly to a method of monitoring carbon dioxide leakage in carbon capture and storage reservoirs based on measuring electrical conductivity and seismic P-wave velocity of a cap rock above a carbon dioxide storage reservoir.

2. Description of the Related Art

Carbon capture and storage (CCS) (sometimes also referred to as carbon capture and sequestration) is the process of capturing waste carbon dioxide ($CO_2$) from large point sources (such as fossil fuel power plants), transporting it to a storage site, and depositing it where it will not enter the atmosphere. The waste $CO_2$ is typically stored in an underground geological formation. The aim of CCS is to prevent the release of large quantities of $CO_2$ into the atmosphere from fossil fuel use in power generation and other industries. CCS is a potential means of mitigating the contribution of fossil fuel emissions to global warming and ocean acidification. Although $CO_2$ has been injected into geological formations for several decades for various purposes, including enhanced oil recovery, the long term storage of $CO_2$ is a relatively new concept.

One of the most important aspects associated with carbon capture and storage is the ability to detect $CO_2$ leakage from the storage reservoir at an early stage. Seismic and electromagnetic (EM) methods can be used to detect changes in physical properties, such as porosity and fluid saturation of the subsurface layers due to $CO_2$ leakage. With regard to EM methods, the electrical conductivity ($\sigma$) is sensitive to resistive gaseous or supercritical $CO_2$ replacing a conductive pore fluid in a porous medium. Thus, electromagnetic surveying can be a significant complementary technique to seismic monitoring. While seismic methods can be used to detect gas with limited quantitative information, electromagnetic methods are robust when it comes to predicting gas saturation.

Seismic measurements can provide information about the elastic properties of the storage medium, such as P-wave velocity ($V_P$), while EM measurements can provide information about the EM properties (namely, electrical conductivity) of the subsurface layers. As $CO_2$ migrates out of the reservoir, the conductivity and the P-wave velocity of the new host rock will change. The integration of rock properties from seismic and EM data can provide better delineation of the leakage pathway than the physical properties from each method individually. Thus, it would obviously be desirable to provide a technique for the joint inversion of porosity and water saturation from electrical conductivity ($\sigma$) and P-wave velocity ($V_P$) measurements.

The electrical properties of rocks depend on the pore geometry, the constituent minerals, the type of fluids and their saturations. Hydrocarbons and $CO_2$ are considered to be electrically resistive. The electrical resistivity of reservoir rocks is highly sensitive to changes in water saturation. This high sensitivity to water saturation in a reservoir can be exploited by EM techniques, where the response is a function of the rock bulk electrical resistivity.

Archie's law is an empirical relation which is used to describe the electrical resistivity of sedimentary rocks ($\rho_t$) ($\Omega \cdot m$) as a function of water saturation, porosity and pore-fluid resistivity ($\rho_w$) as:

$$\rho_t = a\phi^{-m}S_w^{-n}\rho_w, \quad (1)$$

where m is the cementation factor (between 1.8 and 2.0 for sandstones), n is the saturation exponent (typically around 2), a is the tortuosity factor, $\phi$ is the porosity and $S_w$ is the water saturation. The formation factor, F, is defined as:

$$F = \frac{a}{\phi^m} = \frac{\rho_0}{\rho_w} \quad (2)$$

where $\rho_0$ is the resistivity of the rock filled with only water ($S_w=1$). The ratio between $\rho_t$ and $\rho_0$ is known as the resistivity index, I, thus:

$$I = \frac{\rho_t}{\rho_0}. \quad (3)$$

In terms of conductivity (S/m), Archie's law can be written as:

$$\sigma = (1-\phi)^p \sigma_s + \sigma_f \phi^m, \quad (4)$$

where $\sigma_f$ is the conductivity of the fluid filling the pore and $\sigma_s$ is the conductivity of the solid minerals. Each phase has its own connectivity and a representative exponent (m and p). Large exponents occur for low connectivity phases, and small exponents occur for high connectivity phases. The exponent p is given by:

$$p = \frac{\log(1-\phi^m)}{\log(1-\phi)}. \quad (5)$$

The Hermance model is modification of Archie's law that has been developed to study the electrical conductivity of the crust and mantle. The relationship relates the bulk rock resistivity to the pore fluid resistivity and porosity as:

$$\sigma = (\sigma_f - \sigma_s)\varnothing^m + \sigma_s = (1-\phi^m)\sigma_s + \sigma_f \phi^m. \quad (6)$$

If $\sigma_s \to 0$, then equation (6) reduces to Archie's law.

The porosity of two-constituent composite rock in terms of the lower and upper Hashin-Shtrikman (HS) bounds on the electrical conductivity is given as:

$$\phi^{-HS} = \left(\frac{\sigma_s - \sigma_{HS}^-}{\sigma_s - \sigma_f}\right) - \left(\frac{\sigma_f + 2\sigma_s}{\sigma_{HS}^- + 2\sigma_s}\right) \quad (7)$$

$$\phi^{+HS} = \left(\frac{\sigma_s - \sigma_{HS}^+}{\sigma_s - \sigma_f}\right) - \left(\frac{3\sigma_f}{\sigma_{HS}^+ + 2\sigma_s}\right), \quad (8)$$

where $\sigma_{HS}^-$ and $\sigma_{HS}^+$ are the lower and upper Hashin-Shtrikman bounds for electrical conductivity, respectively.

A self-similar theory has been developed to study the dielectric response of water-saturated rocks based on a realistic model of the pore space. In order to include the local environmental effects around a grain, a self-similar model is generated by envisioning that each rock grain itself is coated with a skin made of other coated spheres. In the self-similar model, the conductivity of the rock satisfies:

$$\phi = \sum_{i=0}^{N} p_i \left( \frac{\sigma - \sigma_i}{2\sigma - \sigma_i} \right), \quad (9)$$

where $\sigma_i$ and $p_i$ are the conductivity and the volume fraction of the i-th phase, respectively. A water-wet rock that remains percolating for small values of porosity can be obtained from the assumption that water is the starting host material into which infinitesimal amounts of spheres of matrix and fluids are gradually included. This model is in agreement with Archie's law because it preserves the continuity of the water phase. For two constituents (solid and fluid), the solution is given as:

$$\phi = f(\sigma, \sigma_s, \sigma_f) = \left( \frac{\sigma_s - \sigma}{\sigma_s - \sigma_f} \right) \left( \frac{\sigma_f}{\sigma} \right)^W, \quad (10)$$

where $W = \frac{1}{3}$ for spherical inclusions. The EM properties of finely plane-layered media can be obtained by using Backus averaging. Considering a plane-layered medium where each layer is homogeneous, isotropic and thin (compared to the wavelength of the electromagnetic wave), then, if the layers interfaces are parallel to the x-y plane, the properties are independent in the x and y directions. The equivalent medium is transversely isotropic and can be described with two components of the conductivity tensor:

$$\begin{pmatrix} \sigma_{11} \\ \sigma_{33}^{-1} \end{pmatrix} = \begin{pmatrix} \sigma_1 & \sigma_2 \\ \sigma_1^{-1} & \sigma_2^{-1} \end{pmatrix} \begin{pmatrix} p_1 \\ p_2 \end{pmatrix}, \quad (11)$$

where it is assumed that there are two thin layers of proportions $p_1$ and $p_2$ and conductivities $\sigma_1$ and $\sigma_2$. The proportions $p_1$ and $p_2$ can be expressed as:

$$p_1 = \frac{\sigma_{11} - \sigma_2}{\sigma_1 - \sigma_2} = \frac{\sigma_{11}^{-1} - \sigma_2^{-1}}{\sigma_1^{-1} - \sigma_2^{-1}} \quad (12)$$

and $$p_2 = 1 - p_1.$$

A formulation that is commonly used to estimate the electromagnetic properties of rocks is known as the complex refractive index method (CRIM). For negligible dielectric permittivity, the CRIM model can be expressed as:

$$\sigma = [(1-\phi) \cdot \Sigma_{i=1}^{Nsolid} f_i (\sigma_i)^{1/2} + \phi \cdot (S_w \sigma_w^{1/2} + S_o \sigma_o^{1/2} + S_g \sigma_g^{1/2})]^2, \quad (13)$$

where $f_i$ is the fractional volume of the i-th solid component; $\sigma_i$, $\sigma_w$, $\sigma_o$, and $\sigma_g$ are the conductivity of the i-th solid phase, water, oil and gas, respectively; and $S_w$, $S_o$, and $S_g$ are the saturations of water, oil, and gas, respectively. The CRIM model has been found to give good results at high frequencies (above ~0.5 GHz). The CRIM model has also been used for electromagnetic data at low frequencies (~200 Hz) to obtain electrical conductivity. The electrical conductivity as a function of saturation, porosity and clay content based on the CRIM model is given by:

$$\sigma = [(1-\phi) \cdot C \sigma_c^{1/2} + \phi (1-S_g) \sigma_b^{1/2}]^2, \quad (14)$$

where C is the clay content, $\sigma_c$, and $\sigma_b$ are the clay and brine conductivities, respectively, and $S_g$ is the gas saturation, FIGS. 2A and 2B show that the CRIM conductivity-porosity model fits the shale and sandy sections of a well in the Gullfaks field of the North Sea, respectively, better than other models.

The CRIM equation is commonly expressed by the following formula:

$$\sqrt{\sigma} = (1-\phi)\sqrt{\sigma_m} + \phi S_w \sqrt{\sigma_w} + \phi(1-S_w)\sqrt{\sigma_a}, \quad (15)$$

where $\sigma_m$, $\sigma_w$, and $\sigma_a$ are the electrical conductivities of the solid matrix, water, and air in the material, respectively. For a rock with a multi-mineral matrix and/or multi-phase fluid, the CRIM model of equation (13) can be used. $\sigma_w$ is typically calculated as:

$$\sigma_w = 0.15 \times TDS, \quad (16)$$

where TDS indicates the total dissolved solids in parts per thousand (ppt) or g/L. FIG. 3 shows a plot of $\sigma$ in equation (15) as a function of $\phi$ and $S_w$ in a typical brine saturated shale. Table 1 lists typical values of rock and fluid properties used to generate plots of the electrical conductivity and P-wave velocity, including the plot of FIG. 3. These values are representative of shales.

TABLE 1

Rock and Fluid Properties for Typical Brine-Saturated Shale

| Rock/fluid property | Value | Units |
|---|---|---|
| Quartz volume ($v_q$) | 0.3 | Fraction |
| Clay volume ($v_c$) | $1 - v_q = 0.7$ | Fraction |
| Rock porosity ($\phi$) | 0.1 | Fraction |
| Rock water saturation ($S_w$) | 1.0 | Fraction |
| Conductivity of air ($\sigma_a$) | 0 | Siemen/meter (S/m) |
| Conductivity of water ($\sigma_w$) | Equation (13) | S/m |
| Conductivity of oil ($\sigma_o$) | 0.0001 | S/m |
| Conductivity of quartz ($\sigma_q$) | 0.001 | S/m |
| Conductivity of clay ($\sigma_c$) | 0.01 | S/m |
| Bulk modulus of quartz ($K_q$) | 39 | Gigapascal (GPa) |
| Bulk modulus of clay ($K_c$) | 20 | GPa |
| Bulk modulus of air ($K_a$) | $1.01 \times 10^5$ | Pa |
| Bulk modulus of water ($K_w$) | 2.25 | GPa |
| Shear modulus of quartz ($G_q$) | 40 | GPa |
| Shear modulus of clay ($G_c$) | 15 | GPa |
| Density of air ($\rho_a$) | 1 | kg/m$^3$ |
| Density of water ($\rho_w$) | 1000 | kg/m$^3$ |
| Density of quartz ($\rho_q$) | 2650 | kg/m$^3$ |
| Density of clay ($\rho_c$) | 2500 | kg/m$^3$ |
| Shale critical porosity ($\phi_c$) | 0.4 | Fraction |

Thus, a method of monitoring carbon dioxide leakage in carbon capture and storage reservoirs solving the aforementioned problems is desired.

SUMMARY OF THE INVENTION

The method of monitoring carbon dioxide leakage in carbon capture and storage reservoirs estimates porosity and water saturation in a porous medium, such as brine-saturated shale, as is common in carbon capture and storage (CCS) reservoirs, based upon measured electrical conductivity ($\sigma$) and seismic P-wave velocity ($V_p$). The estimated porosity and water saturation may be used for monitoring carbon dioxide ($CO_2$) leakage from a carbon dioxide reservoir to the overlying cap rock of the region. Controlled source electromagnetic (CSEM) surveying is performed repeatedly at close intervals over the carbon dioxide reservoir to measure the electrical conductivity in the cap rock. A seismic survey is performed right after each CSEM survey in order to measure the P-wave velocity in the cap rock at the same locations where the electrical conductivities were measured.

The measured electrical conductivity and seismic P-wave velocity data is then used by the method of monitoring carbon dioxide leakage in carbon capture and storage reservoirs to estimate the porosity and water saturation in the cap rock. If a decrease in water saturation in the cap rock is found corresponding to sequential measurements, this indicates an increase in gas saturation, which indicates that carbon dioxide may be leaking up from the carbon dioxide reservoir. An alert signal is then generated to indicate that there may be a carbon dioxide leak.

The method of monitoring carbon dioxide leakage in carbon capture and storage reservoirs includes the following steps: (a) setting an integer i equal to zero; (b) measuring an electrical conductivity σ and a seismic P-wave velocity $V_p$ at a cap rock location above a carbon dioxide storage reservoir; (c) calculating a porosity φ associated with the cap rock as:

$$V_p = \sqrt{\frac{\phi K_a K_m K_w + (\phi_c - \phi)\left(K_m + \frac{4}{3}G_m\right)}{\frac{[\phi_c K_m K_w (1 - S_w) + K_a((1-\phi_c)K_w + \phi_c K_m S_w)]}{\phi_c[\phi_c K_m K_w (1 - S_w) + K_a((1-\phi_c)K_w + \phi_c K_m S_w)]}}{[(1-S_w)\phi \rho_a + (1-\phi)\rho_m + \phi S_w \rho_w]}}$$

where a water saturation $S_w$ of the cap rock is given by:

$$S_w = \frac{\sqrt{\sigma} - (1-\phi)\sqrt{\sigma_m} - \phi\sqrt{\sigma_a}}{\phi(\sqrt{\sigma_w} - \sqrt{\sigma_a})},$$

where $\sigma_m$ is an electrical conductivity of a solid matrix of the cap rock, $\sigma_w$ is an electrical conductivity of water in the cap rock, and $\sigma_a$ is an electrical conductivity of air in the cap rock, $K_a$ is a bulk modulus of the air in the cap rock, $K_m$ is a bulk modulus of the solid matrix of the cap rock, $K_w$ is a bulk modulus of the water in the cap rock, $\phi_c$ is a critical porosity of the cap rock, $G_m$ is a shear modulus of the solid matrix of the cap rock, $\rho_a$ is a density of the air in the cap rock, $\rho_m$ is a density of the solid matrix of the cap rock, and $\rho_w$ is a density of the water in the cap rock; (d) calculating an i-th value of the water saturation $S_{wi}$ of the cap rock as:

$$S_{wi} = \frac{\sqrt{\sigma} - (1-\phi)\sqrt{\sigma_m} - \phi\sqrt{\sigma_a}}{\phi(\sqrt{\sigma_w} - \sqrt{\sigma_a})};$$

(e) recording the i-th value of the water saturation $S_{wi}$ of the cap rock in non-transitory, computer-readable memory; and (f) if consecutive i-th values of the water saturation of the cap rock decrease, then generating an alert signal to indicate a carbon dioxide leak in the cap rock, and if the consecutive i-th values of the water saturation of the cap rock do not decrease, then setting i=i+1 and returning to step (b).

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method of monitoring carbon dioxide leakage in carbon capture and storage reservoirs estimates porosity and water saturation in a porous medium, such as brine-saturated shale commonly found in carbon capture and storage (CCS) reservoirs, based upon measured electrical conductivity (σ) and seismic P-wave velocity ($V_p$). The estimated porosity and water saturation may be used for monitoring carbon dioxide ($CO_2$) leakage from a carbon dioxide reservoir to the overlying cap rock of the region. Controlled source electromagnetic (CSEM) surveying is performed repeatedly at close intervals over the carbon dioxide reservoir to measure the electrical conductivity in the cap rock. A seismic survey is performed right after each CSEM survey in order to measure the P-wave velocity in the cap rock at the same locations where the electrical conductivities were measured. The measured electrical conductivity and seismic P-wave velocity data is then used by the method of monitoring carbon dioxide leakage in carbon capture and storage reservoirs to estimate the porosity and water saturation in the cap rock. If a decrease in water saturation in the cap rock is found, corresponding to sequential measurements, this indicates an increase in gas saturation, which indicates that carbon dioxide may be leaking up from the carbon dioxide reservoir. An alert signal is then generated to indicate that there may be a carbon dioxide leak.

Figure 1:
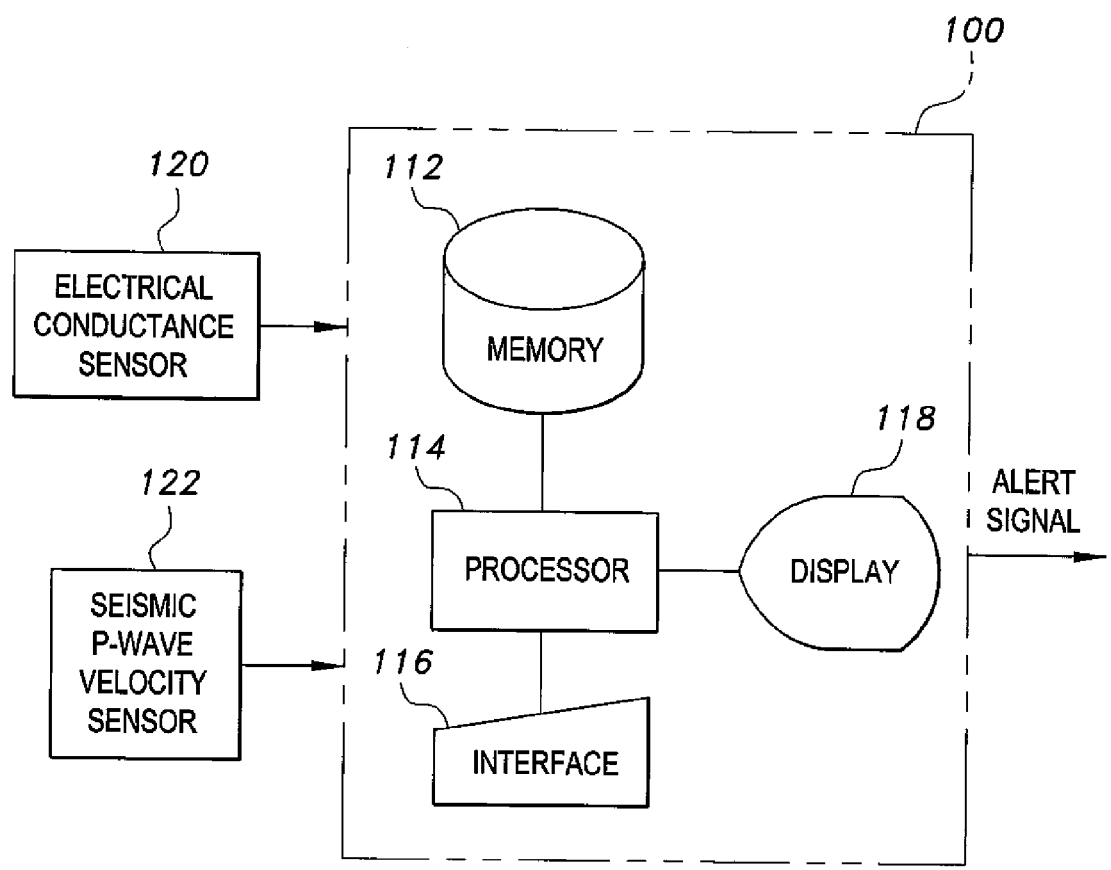
FIG. 1 is a block diagram illustrating system components for implementing a method of monitoring carbon dioxide leakage in carbon capture and storage reservoirs according to the present invention.
Figure 2A:
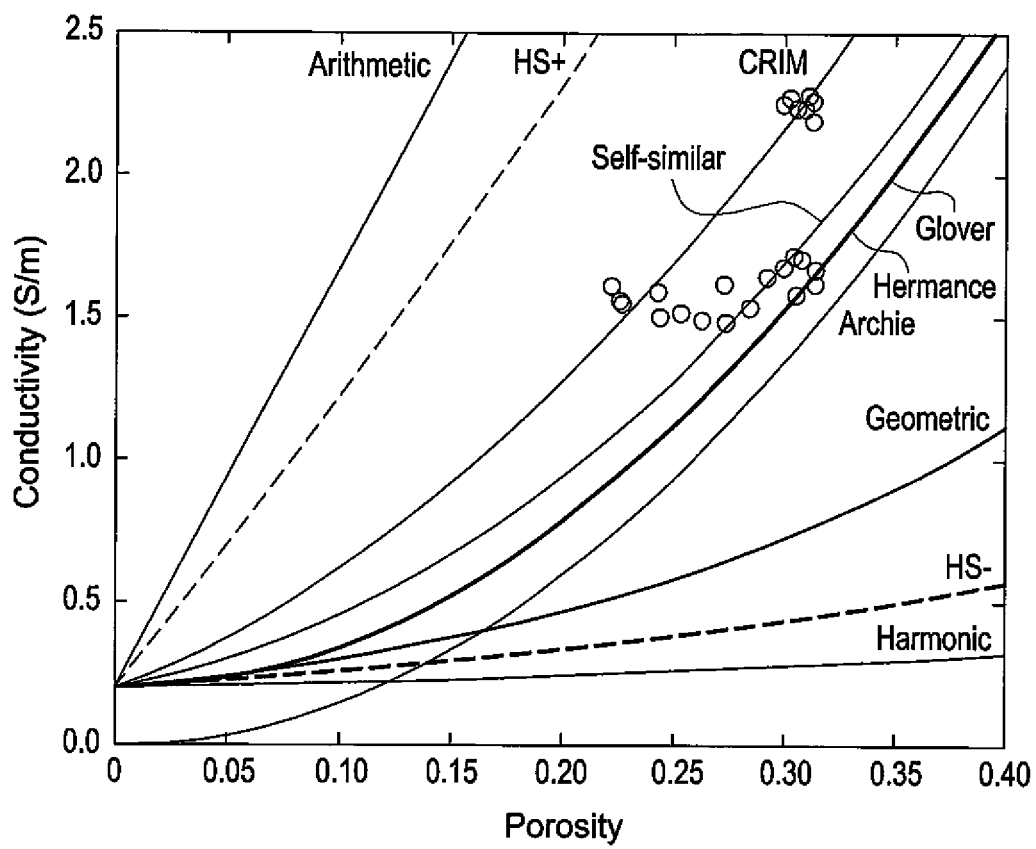
FIG. 2A is a graph comparing conductivity as a function of porosity modeled by the prior art complex refractive index method (CRIM) against other prior art techniques, including a basic arithmetic model, a harmonic model, a geometric model, the Hermance model, a self-similar model, the Hashin-Shtrikman model, Archie's law, and a modified version of Archie's law (indicated as by the "Glover" curve) for data obtained from a shale section of a well in the Gullfaks field of the North Sea.
Figure 2B:
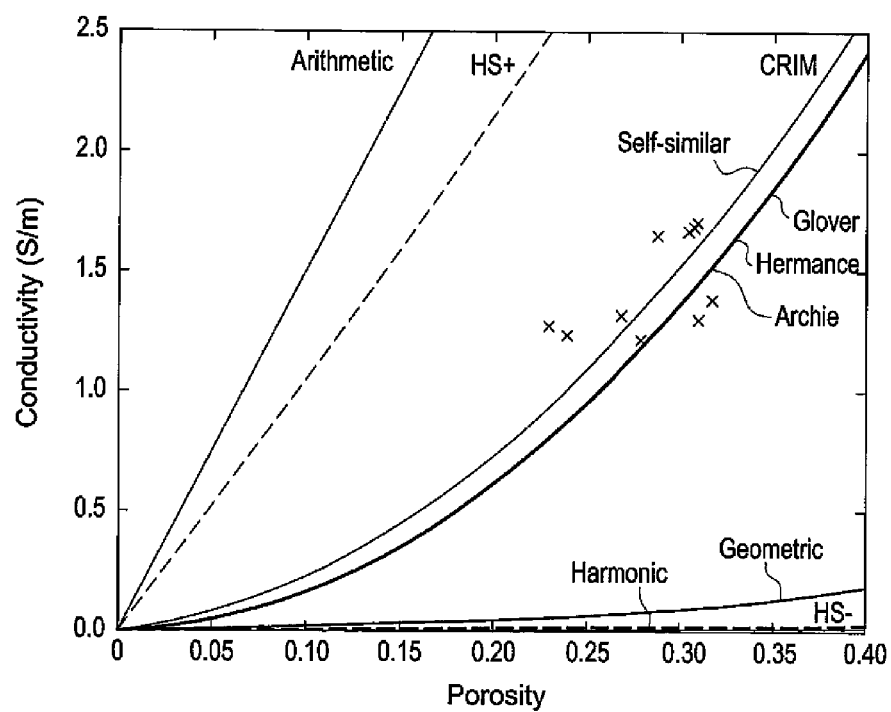
FIG. 2B is a graph comparing conductivity as a function of porosity modeled by the prior art complex refractive index method (CRIM) against other prior art techniques, including a basic arithmetic model, a harmonic model, a geometric model, the Hermance model, a self-similar model, the Hashin-Shtrikman model, Archie's law, and a modified version of Archie's law (indicated as by the "Glover" curve) for data obtained from a sandy section of the same well as in FIG. 2A.
Figure 3:
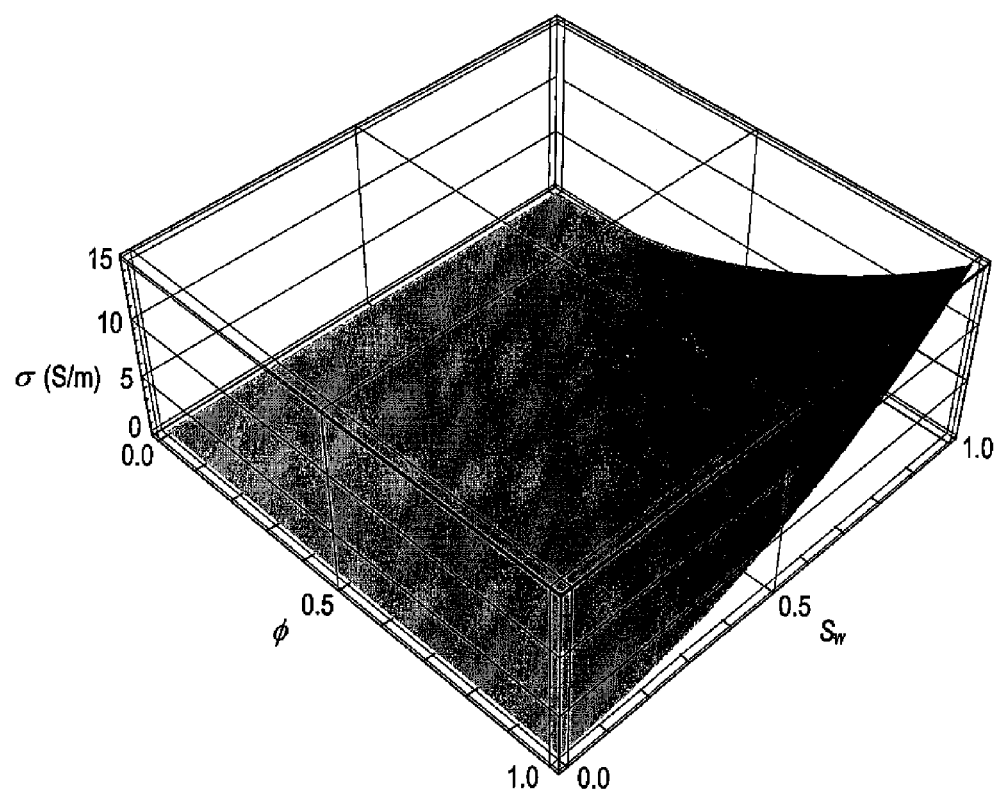
FIG. 3 is a three-dimensional plot of electrical conductance as a function of porosity and brine saturation modelled by the prior art complex refractive index method (CRIM) for a typical brine-saturated shale.

It should be understood that the calculations of the present method can be performed by any suitable computer system, such as that diagrammatically shown in FIG. 1. Data is entered into the system 100 via any suitable type of user interface 116, and can be stored in memory 112, which can be any suitable type of computer readable and programmable memory and is preferably a non-transitory, computer readable storage medium. Calculations are performed by a processor 114, which can be any suitable type of computer processor, and can be displayed to the user on display 118, which can be any suitable type of computer display. The electrical conductivity σ and seismic P-wave velocity $V_p$ are fed to the system by any suitable type of electrical conductivity sensor 120, such as a CSEM system or the like, and by any suitable type of seismic P-wave velocity sensor 122.

The processor 114 can be associated with or incorporated into any suitable type of computing device, for example, a personal computer, a programmable logic controller (PLC), or an application specific integrated circuit (ASIC). The display 118, the processor 114, the memory 112 and any associated computer readable recording media are in communication with one another by any suitable type of data bus, as is well known in the art.

Examples of computer-readable recording media include non-transitory storage media, a magnetic recording apparatus, an optical disk, a magneto-optical disk, and/or a semiconductor memory (for example, RAM, ROM, etc.). Examples of magnetic recording apparatus that can be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. It should be understood that non-transitory computer-readable storage media include all computer-readable media, with the sole exception being a transitory, propagating signal.

Although several models have been proposed to explain the relation between $V_P$, φ and $S_w$ in porous media, the Gassmann model is the most commonly used among these models for low-frequency (less than 100 Hz) seismic studies. The Gassmann model is appropriate for CCS because $V_P$ measured from surface seismic reflection surveys has frequencies that fall within this range. In this model, the bulk ($K_s$) and shear ($G_s$) moduli of the saturated material are given by:

$$\frac{K_S}{K_m - K_S} = \frac{K_d}{K_m - K_d} + \frac{K_f}{\phi(K_m - K_f)} \tag{17}$$

$$G_s = G_d, \tag{18}$$

where $K_m$, $K_d$ and $K_f$ are the bulk moduli of the mineral making up the rock, the dry rock, and the pore fluid, respectively, and $G_d$ is the shear modulus of the dry rock. The pore-fluid bulk modulus of an air-water mixture is given by Wood's formula as:

$$\frac{1}{K_f} = \frac{S_w}{K_w} + \frac{(1 - S_w)}{K_a}, \tag{19}$$

where $K_w$ and $K_a$ are the bulk moduli of the pore water and air, respectively. The dry-rock bulk and shear moduli can be approximated by the following linear relations in the porosity range $\phi \le \phi_c$:

$$K_d = K_m \left(1 - \frac{\phi}{\phi_c}\right) \tag{20}$$

$$G_d = G_m \left(1 - \frac{\phi}{\phi_c}\right), \tag{21}$$

where $G_m$ is the shear modulus of the mineral making up the rock and $\phi_c$ is the critical porosity of the rock. The critical porosity of a porous medium is the porosity at which the medium changes its mechanical behavior from a medium in which the mineral grains are load-bearing to a suspension in which the fluid phase is load-bearing. The typical critical porosity for shales is $\phi_c = 0.4$. For a multi-mineral rock matrix, $K_m$ and $G_m$ can be estimated using Hill's average of the Voigt and Reuss bounds as:

$$K_m = \frac{1}{2} \times \left[\sum_i (p_i \times K_i) + \sum_i \left(\frac{p_i}{K_i}\right)\right] \tag{22}$$

$$G_m = \frac{1}{2} \times \left[\sum_i (p_i \times G_i) + \sum_i \left(\frac{p_i}{G_i}\right)\right], \tag{23}$$

where $p_i$, $K_i$, and $G_i$ are the fractional volume, the bulk, and shear moduli of the i-th mineral phase of the rock matrix.

The P-wave velocity in the rock at any porosity or saturation is given by:

$$V_p = \sqrt{\frac{K_s + \frac{4}{3}G_s}{\rho_s}}, \tag{24}$$

where $\rho_s$ is the density of the saturated rock, given by:

$$\rho_s = (1-\phi)\rho_m + \phi(1-S_w)\rho_a + \phi S_w \rho_w, \tag{25}$$

where $\rho_m$, $\rho_w$ and $\rho_a$ are the densities of the mineral making up the rock, pore water, and air, respectively. The final form of $V_p$ (φ, $S_w$) is given as:

$$V_p = \sqrt{\frac{\phi K_a K_m K_w + (\phi_c - \phi)\left(K_m + \frac{4}{3}G_m\right)[\phi_c K_m K_w (1 - S_w) + K_a((1 - \phi_c)K_w + \phi_c K_m S_w)]}{\phi_c[\phi_c K_m K_w (1 - S_w) + K_a((1 - \phi_c)K_w + \phi_c K_m S_w)]}}. \tag{26}$$
$$[(1-S_w)\phi\rho_a + (1-\phi)\rho_m + \phi S_w \rho_w]$$

Figure 4:
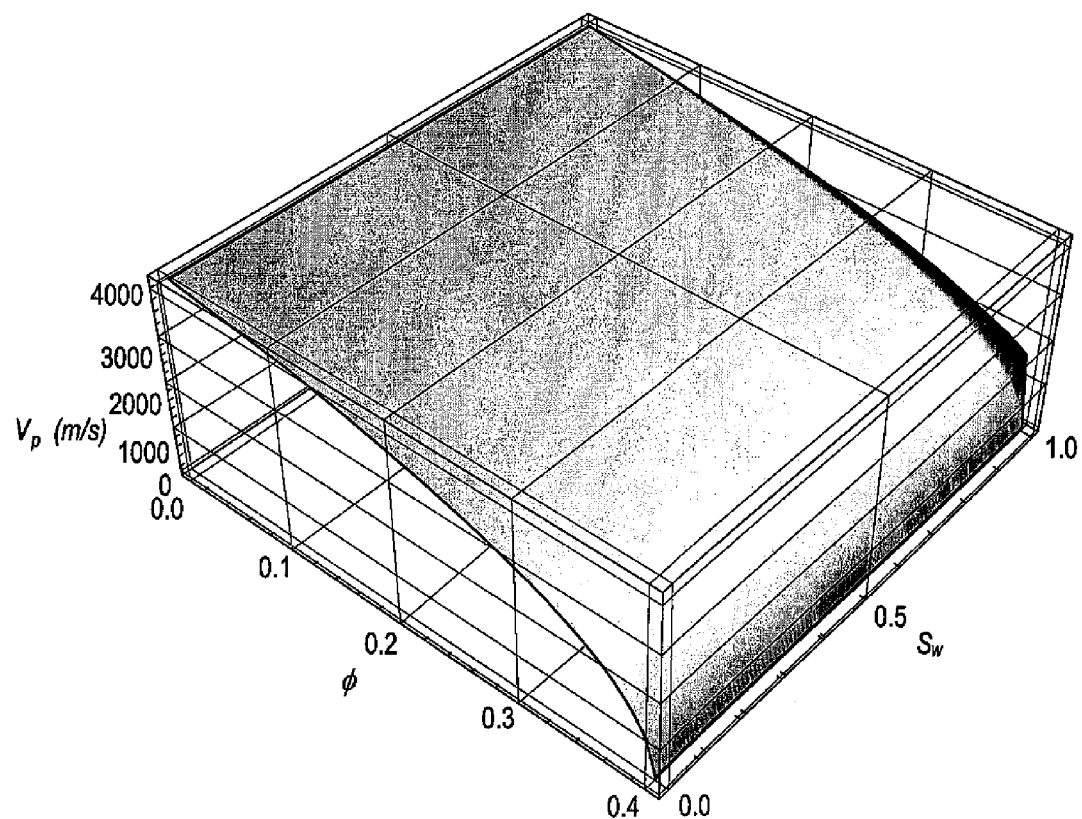
FIG. 4 is a three-dimensional plot for P-wave velocity as a function of porosity and brine saturation for a typical brine-saturated shale.

FIG. 4 shows a plot of $V_P$ in equation (26) as a function of φ and $S_w$ in a typical brine-saturated shale. It should be noted that this formulation is valid only from rock porosities from zero to the critical porosity of the rock, since the rock will behave like a suspension beyond this porosity and another formulation is required to estimate $V_P$ (e.g., Wood's formula).

The method of monitoring carbon dioxide leakage in carbon capture and storage reservoirs includes the following steps: (a) setting an integer i equal to zero; (b) measuring an electrical conductivity σ and a seismic P-wave velocity $V_p$ at a cap rock location above a carbon dioxide storage reservoir; (c) calculating a porosity φ associated with the cap rock as:

$$V_P = \sqrt{\frac{\phi K_a K_m K_w + (\phi_c - \phi)\left(K_m + \frac{4}{3}G_m\right)[\phi_c K_m K_w (1 - S_w) + K_a((1 - \phi_c)K_w + \phi_c K_m S_w)]}{\phi_c[\phi_c K_m K_w (1 - S_w) + K_a((1 - \phi_c K_m S_w)]} \cdot \frac{1}{[(1 - S_w)\phi\rho_a + (1 - \phi)\rho_m + \phi S_w \rho_w]}}$$

where a water saturation $S_w$ of the cap rock is given by:

$$S_w = \frac{\sqrt{\sigma} - (1 - \phi)\sqrt{\sigma_m} - \phi\sqrt{\sigma_a}}{\phi(\sqrt{\sigma_w} - \sqrt{\sigma_a})};$$

where $\sigma_m$ is an electrical conductivity of a solid matrix of the cap rock, $\sigma_w$ is an electrical conductivity of water in the cap rock, and $\sigma_a$ is an electrical conductivity of air in the cap rock, $K_a$ is a bulk modulus of the air in the cap rock, $K_m$ is a bulk modulus of the solid matrix of the cap rock, $K_w$ is a bulk modulus of the water in the cap rock, $\phi_c$ is a critical porosity of the cap rock, $G_m$ is a shear modulus of the solid matrix of the cap rock, $\rho_a$ is a density of the air in the cap rock, $\rho_m$ is a density of the solid matrix of the cap rock, and $\rho_w$ is a density of the water in the cap rock; (d) calculating an i-th value of the water saturation $S_{wi}$ of the cap rock as:

$$S_{wi} = \frac{\sqrt{\sigma} - (1 - \phi)\sqrt{\sigma_m} - \phi\sqrt{\sigma_a}}{\phi(\sqrt{\sigma_w} - \sqrt{\sigma_a})};$$

(e) recording the i-th value of the water saturation $S_{wi}$ of the cap rock in non-transitory, computer-readable memory; and (f) if consecutive i-th values of the water saturation of the cap rock decrease, then generating an alert signal to indicate a carbon dioxide leak in the cap rock, and if the consecutive i-th values of the water saturation of the cap rock do not decrease, then setting i=i+1 and returning to step (b).

In step (c), the nonlinear equation in $\phi$ results in two real solutions. Checking the validity of the solutions using known models showed that only one of the solutions consistently gave the correct porosities of tested model, which is used as the value $\phi(\sigma, V_P, K_m, K_w, K_a, G_m, \phi_c, \rho_m, \rho_w, \rho_a, \sigma_m, \sigma_w, \sigma_a)$. The other solution was found to always give the wrong porosity values, and is thus neglected.

Figure 5:
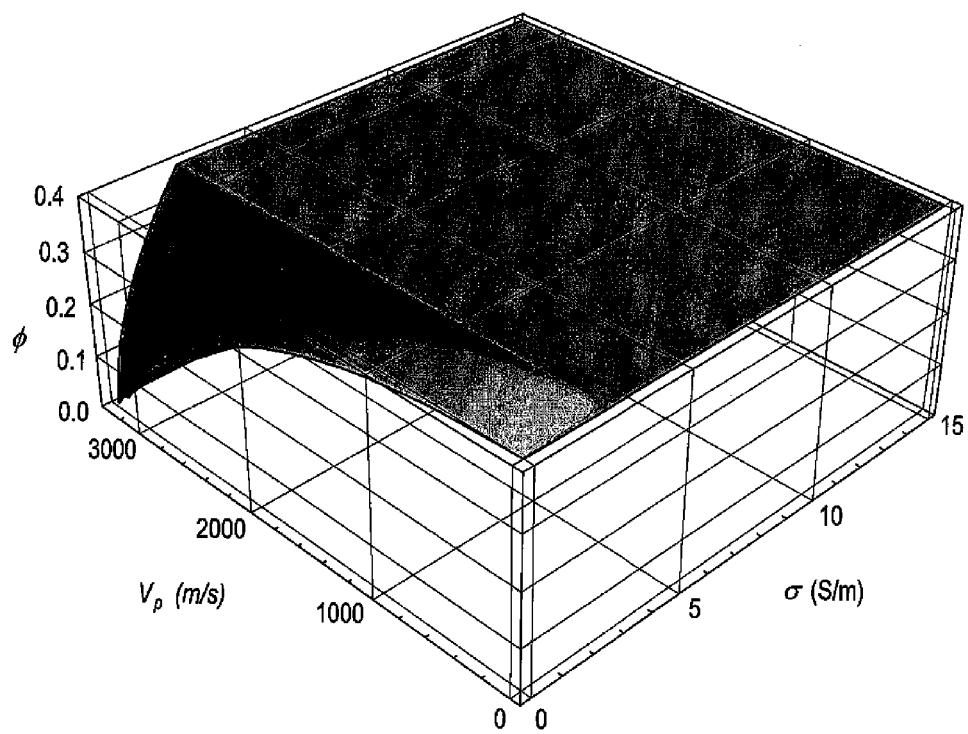
FIG. 5 is a three-dimensional plot of inverted porosity as a function of measured P-wave velocity and electrical conductance generated by the method of monitoring carbon dioxide leakage in carbon capture and storage reservoirs according to the present invention.
Figure 6:
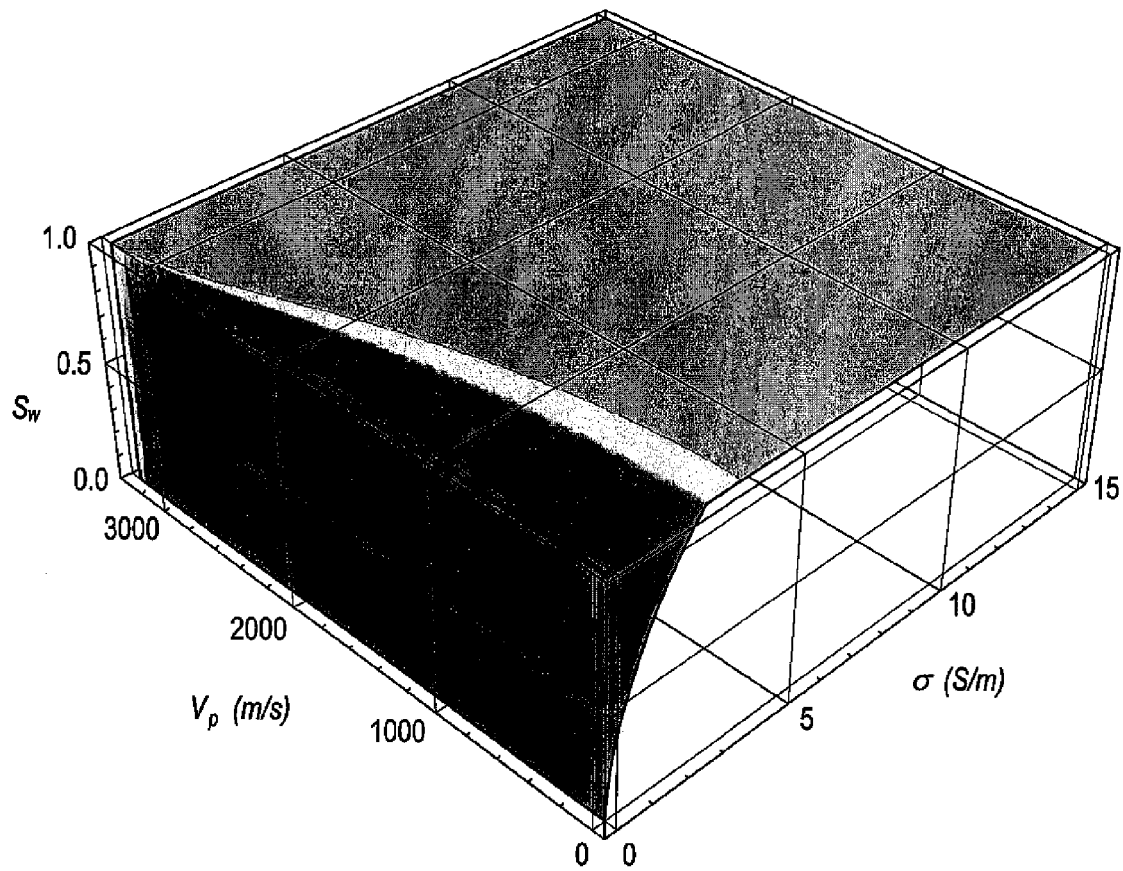
FIG. 6 is a three-dimensional plot of inverted brine-saturation as a function of measured P-wave velocity and electrical conductance generated by the method of monitoring carbon dioxide leakage in carbon capture and storage reservoirs according to the present invention.

The calculated inverted $\phi(\sigma, V_P, K_m, K_w, K_a, G_m, \phi_c, \rho_m, \rho_w, \rho_a, \sigma_m, \sigma_w, \sigma_a)$ from step (c) and the inverted $S_{wi}(\sigma, V_P, K_m, K_w, K_a, G_m, \phi_c, \rho_m, \rho_w, \rho_a, \sigma_m, \sigma_w, \sigma_a)$ from step (d) for the case of a brine-saturated shale using the values in Table 1 for the mineral and pore-fluid properties are shown in FIGS. 5 and 6, respectively. The method of monitoring carbon dioxide leakage in carbon capture and storage reservoirs has been applied to 17 $\sigma$-$V_P$ well-log measurements in a shale section of a vertical well from the Gullfaks field of the North Sea, which was fully saturated with brine. Table 2 provides a list of these $\sigma$-$V_P$ measurements.

TABLE 2

$\sigma$-$V_P$ Measurements of Shale Section

| Measured $V_P$ (km/s) | Measured $\sigma$ (S/m) | Lithology |
|---|---|---|
| 2.90 | 1.52 | Shale |
| 2.80 | 1.51 | Shale |
| 2.79 | 1.53 | Shale |

TABLE 2-continued $\sigma$-$V_P$ Measurements of Shale Section

| Measured $V_P$ (km/s) | Measured $\sigma$ (S/m) | Lithology |
|---|---|---|
| 2.79 | 1.52 | Shale |
| 2.70 | 1.51 | Shale |
| 2.70 | 1.48 | Shale |
| 2.63 | 1.55 | Shale |
| 2.70 | 1.54 | Shale |
| 2.61 | 1.60 | Shale |
| 2.59 | 1.50 | Shale |
| 2.60 | 1.42 | Shale |
| 2.40 | 2.12 | Shale |
| 2.41 | 2.20 | Shale |
| 2.38 | 2.30 | Shale |
| 2.41 | 2.35 | Shale |
| 2.42 | 2.21 | Shale |
| 2.50 | 2.40 | Shale |

Table 3 shows the well-log porosities measured in this depth interval alongside those estimated by the present method of monitoring carbon dioxide leakage in carbon capture and storage reservoirs, with absolute errors shown in the rightmost column. The absolute errors lie between 0.5% and 25% with a mean of 7.35% and a standard deviation of 7.33%. The points with relatively high error may be attributed to local heterogeneities within this shale interval caused by different matrix and/or fluid properties than those used for the inversion.

TABLE 3

Comparison Between Measured and Estimated Porosities

| Measured $\phi$ | Estimated $\phi$ | Absolute Error (%) |
|---|---|---|
| 0.221 | 0.229 | 3.8 |
| 0.222 | 0.228 | 2.8 |
| 0.224 | 0.231 | 2.9 |
| 0.241 | 0.229 | 4.8 |
| 0.242 | 0.228 | 5.7 |
| 0.254 | 0.225 | 11.6 |
| 0.261 | 0.233 | 10.8 |
| 0.272 | 0.232 | 14.8 |
| 0.274 | 0.239 | 12.9 |
| 0.282 | 0.227 | 19.5 |
| 0.292 | 0.217 | 25.6 |
| 0.300 | 0.294 | 1.8 |
| 0.301 | 0.302 | 0.5 |
| 0.31 | 0.312 | 0.7 |
| 0.312 | 0.317 | 1.6 |
| 0.313 | 0.303 | 3.1 |
| 0.315 | 0.322 | 2.1 |

Table 4 shows the water saturation values measured in this depth interval alongside those estimated by the present method, with absolute errors in the rightmost column. The absolute errors lie between 0.002% and 0.004% with a mean of 0.003% and a standard deviation of 0.0005%.

TABLE 4

Comparison Between Measured and Estimated Water Saturations

| Measured $S_w$ | Estimated $S_w$ | Absolute Error (%) |
|---|---|---|
| 1.0 | 1.00004 | 0.004 |
| 1.0 | 1.00004 | 0.004 |
| 1.0 | 1.00004 | 0.004 |
| 1.0 | 1.00004 | 0.004 |
| 1.0 | 1.00003 | 0.003 |
| 1.0 | 1.00003 | 0.003 |
| 1.0 | 1.00003 | 0.003 |

TABLE 4-continued

Comparison Between Measured and Estimated Water Saturations

| Measured $S_w$ | Estimated $S_w$ | Absolute Error (%) |
|---|---|---|
| 1.0 | 1.00003 | 0.003 |
| 1.0 | 1.00003 | 0.003 |
| 1.0 | 1.00002 | 0.002 |
| 1.0 | 1.00002 | 0.002 |
| 1.0 | 1.00002 | 0.002 |
| 1.0 | 1.00003 | 0.003 |
| 1.0 | 1.00003 | 0.003 |
| 1.0 | 1.00003 | 0.003 |
| 1.0 | 1.00003 | 0.003 |
| 1.0 | 1.00003 | 0.003 |

With the exception of a few samples with relatively high errors, the present method estimated rock porosity within this formation very well. The high-error porosities are clustered in the middle of this shale section, which might be explained by a layer having matrix and/or fluid properties that are slightly different from those used for the inversion. If this is the case, then the background parameters have to be adjusted accordingly. The water saturation results demonstrate much higher accuracy, although readings with a wider range of water saturations are required to confirm this result.

It is to be understood that the present invention is not limited to the embodiments described above, but encompasses any and all embodiments within the scope of the following claims.

I claim:

1. A method of monitoring carbon dioxide leakage in carbon capture and storage reservoirs, comprising the steps of:

(a) setting an integer i equal to zero;

(b) measuring an electrical conductivity $\sigma$ and a seismic P-wave velocity $V_p$ at a cap rock location above a carbon dioxide storage reservoir;

(c) calculating a porosity $\phi$ associated with the cap rock as $$V_p = \sqrt{\frac{\phi K_a K_m K_w + (\phi_c - \phi)\left(K_m + \frac{4}{3}G_m\right)[\phi_c K_m K_w(1 - S_w) + K_a((1 - \phi_c)K_w + \phi_c K_m S_w)]}{\phi_c[\phi_c K_m K_w(1 - S_w) + K_a((1 - \phi_c)K_w + \phi_c K_m S_w)]}}$$
$$\overline{[(1 - S_w)\phi\rho_a + (1 - \phi)\rho_m + \phi S_w \rho_w]}$$

where a water saturation $S_w$ of the cap rock is given by:

$$S_w = \frac{\sqrt{\sigma} - (1-\phi)\sqrt{\sigma_m} - \phi\sqrt{\sigma_a}}{\phi(\sqrt{\sigma_w} - \sqrt{\sigma_a})},$$

wherein $\sigma_m$ is an electrical conductivity of a solid matrix of the cap rock, $\sigma_w$ is an electrical conductivity of water in the cap rock, and $\sigma_a$ is an electrical conductivity of air in the cap rock, $K_a$ is a bulk modulus of the air in the cap rock, $K_m$ is a bulk modulus of the solid matrix of the cap rock, $K_w$ is a bulk modulus of the water in the cap rock, $\phi_c$ is a critical porosity of the cap rock, $G_m$ is a shear modulus of the solid matrix of the cap rock, $\rho_a$ is a density of the air in the cap rock, $\rho_m$ is a density of the solid matrix of the cap rock, and $\rho_w$ is a density of the water in the cap rock;

(d) calculating an i-th value of the water saturation $S_{wi}$ of the cap rock as:

$$S_{wi} = \frac{\sqrt{\sigma} - (1-\phi)\sqrt{\sigma_m} - \phi\sqrt{\sigma_a}}{\phi(\sqrt{\sigma_w} - \sqrt{\sigma_a})};$$

(e) recording the i-th value of the water saturation $S_{wi}$ of the cap rock in non-transitory, computer-readable memory; and (f) if consecutive i-th values of the water saturation of the cap rock decrease, then generating an alert signal to indicate a carbon dioxide leak in the cap rock, and if the consecutive i-th values of the water saturation of the cap rock do not decrease, then setting i=i+1 and returning to step (b).

2. A computer software product that includes a non-transitory storage medium readable by a processor, the non-transitory storage medium having stored thereon a set of instructions for performing monitoring carbon dioxide leakage in carbon capture and storage reservoirs, the instructions comprising:

(a) a first set of instructions which, when loaded into main memory and executed by the processor, causes the processor to set an integer i equal to zero;

(b) a second set of instructions which, when loaded into main memory and executed by the processor, causes the processor to measure an electrical conductivity $\sigma$ and a seismic P-wave velocity $V_p$ at a cap rock location above a carbon dioxide storage reservoir;

(c) a third set of instructions which, when loaded into main memory and executed by the processor, causes the processor to calculate a porosity $\phi$ associated with the cap rock as:

$$V_p = \sqrt{\frac{\phi K_a K_m K_w + (\phi_c - \phi)\left(K_m + \frac{4}{3}G_m\right)[\phi_c K_m K_w(1 - S_w) + K_a((1 - \phi_c)K_w + \phi_c K_m S_w)]}{\phi_c[\phi_c K_m K_w(1 - S_w) + K_a((1 - \phi_c)K_w + \phi_c K_m S_w)]}}$$
$$\overline{[(1 - S_w)\phi\rho_a + (1 - \phi)\rho_m + \phi S_w \rho_w]}$$

where a water saturation $S_w$ of the cap rock is given by:

$$S_w = \frac{\sqrt{\sigma} - (1-\phi)\sqrt{\sigma_m} - \phi\sqrt{\sigma_a}}{\phi(\sqrt{\sigma_w} - \sqrt{\sigma_a})}$$

wherein $\sigma_m$ is an electrical conductivity of a solid matrix of the cap rock, $\sigma_w$ is an electrical conductivity of water in the cap rock, and $\sigma_a$ is an electrical conductivity of air in the cap rock, $K_a$ is a bulk modulus of the air in the cap rock, $K_m$ is a bulk modulus of the solid matrix of the cap rock, $K_w$ is a bulk modulus of the water in the cap rock, $\phi_c$ is a critical porosity of the cap rock, $G_m$ is a shear modulus of the solid matrix of the cap rock, $\rho_a$ is a density of the air in the cap rock, $\rho_m$ is a density of the solid matrix of the cap rock, and $\rho_w$ is a density of the water in the cap rock;

(d) a fourth set of instructions which, when loaded into main memory and executed by the processor, causes the processor to calculate an i-th value of the water saturation $S_{wi}$ of the cap rock as:

$$S_{wi} = \frac{\sqrt{\sigma} - (1-\phi)\sqrt{\sigma_m} - \phi\sqrt{\sigma_a}}{\phi(\sqrt{\sigma_w} - \sqrt{\sigma_a})};$$

(e) a fifth set of instructions which, when loaded into main memory and executed by the processor, causes the processor to record the i-th value of the water saturation $S_{wi}$ of the cap rock in non-transitory, computer-readable memory; and (f) a sixth set of instructions which, when loaded into main memory and executed by the processor, causes the processor to generate an alert signal to indicate a carbon dioxide leak in the cap rock if consecutive i-th values of the water saturation of the cap rock decrease, and to set i=i+1 and return to the second set of instructions if the consecutive i-th values of the water saturation of the cap rock do not decrease.

\* \* \* \* \*